(12) United States Patent
Little et al.

(10) Patent No.: US 8,290,905 B1
(45) Date of Patent: Oct. 16, 2012

(54) METHOD AND SYSTEM FOR ACCESSING INTERFACE DESIGN ELEMENTS

(75) Inventors: J. Ambrose Little, Trenton, NJ (US); Andres Aguiar, Montevideo (UY)

(73) Assignee: Infragistics Inc., East Windsor, NJ (US)

( * ) Notice: Subject to any disclaimer, the term of this patent is extended or adjusted under 35 U.S.C. 154(b) by 425 days.

(21) Appl. No.: 12/584,757

(22) Filed: Sep. 11, 2009

(51) Int. Cl.
*G06F 7/00* (2006.01)
*G06F 17/00* (2006.01)

(52) U.S. Cl. ........ 707/634; 707/736; 707/805; 717/100; 717/104; 715/744; 715/764; 345/650; 345/676

(58) Field of Classification Search ............ 707/706, 707/711, 736, 770, E17.099, E17.102, 634, 707/805, E17.005; 717/100, 104; 715/744, 715/764; 709/203, 232; 345/650, 676
See application file for complete search history.

(56) References Cited

U.S. PATENT DOCUMENTS

| | | | |
|---|---|---|---|
| 7,640,267 B2 * | 12/2009 | Spivack et al. | 707/999.104 |
| 7,802,230 B1 * | 9/2010 | Mendicino et al. | 717/113 |
| 7,831,942 B1 * | 11/2010 | Gennari et al. | 716/52 |
| 7,870,535 B2 * | 1/2011 | Rippert et al. | 717/100 |
| 7,873,946 B2 * | 1/2011 | Lathrop et al. | 717/105 |
| 2002/0059054 A1 * | 5/2002 | Bade et al. | 703/20 |
| 2004/0117759 A1 * | 6/2004 | Rippert et al. | 717/100 |
| 2007/0143339 A1 * | 6/2007 | Springett | 707/103 R |
| 2007/0242082 A1 * | 10/2007 | Lathrop et al. | 345/619 |
| 2008/0092057 A1 * | 4/2008 | Monson et al. | 715/744 |
| 2008/0092957 A1 * | 4/2008 | Rosaen | 137/101.19 |
| 2008/0189679 A1 * | 8/2008 | Rodriguez et al. | 717/105 |
| 2008/0234987 A1 * | 9/2008 | Haley | 703/1 |
| 2009/0024362 A1 * | 1/2009 | Linzie | 703/1 |
| 2009/0064205 A1 * | 3/2009 | Fay et al. | 707/E17.044 |
| 2010/0057815 A1 * | 3/2010 | Spivack et al. | 707/794 |
| 2010/0131482 A1 * | 5/2010 | Linthicum et al. | 707/706 |

OTHER PUBLICATIONS

Changtao Qu and Wolfgang Nejdl—"Searching SCORM Metadata in a RDF-based E-Learning P2P Network Using XQuery and Query by Example"—Proceedings of the The 3rd IEEE International Conference on Advanced Learning Technologies (ICALT'03), 2003 IEEE—Jul. 9-11, 2003—pp. 81-85.*
Horst Eidenberger and Christian Breiteneder—"VizIR-a framework for visual information retrieval"—Journal of Visual Languages & ..., 2004—Citeseer—Received May 31, 2002; received in revised form Mar. 4, 2003; accepted Apr. 28, 2003, (pp. 1-27).*
"Yahoo! Design Pattern Library." Copyright © 2009 Yahoo! Inc. Downloaded from web site http://developer.yahoo.com/ypatterns/ on Dec. 9, 2009.

* cited by examiner

*Primary Examiner* — John E Breene
*Assistant Examiner* — Anh Ly
(74) *Attorney, Agent, or Firm* — Moser Taboada

(57) ABSTRACT

A method and system for indexing design elements. The method, when performed by a special purpose computer executing a design repository application, comprises creating one or more metadata entries, linking the metadata entries to one or more design elements, and providing an interface to access the design elements. The metadata entries comprise data describing the design elements located within a design repository. The interface displays the design elements in accordance with their associated metadata.

10 Claims, 6 Drawing Sheets

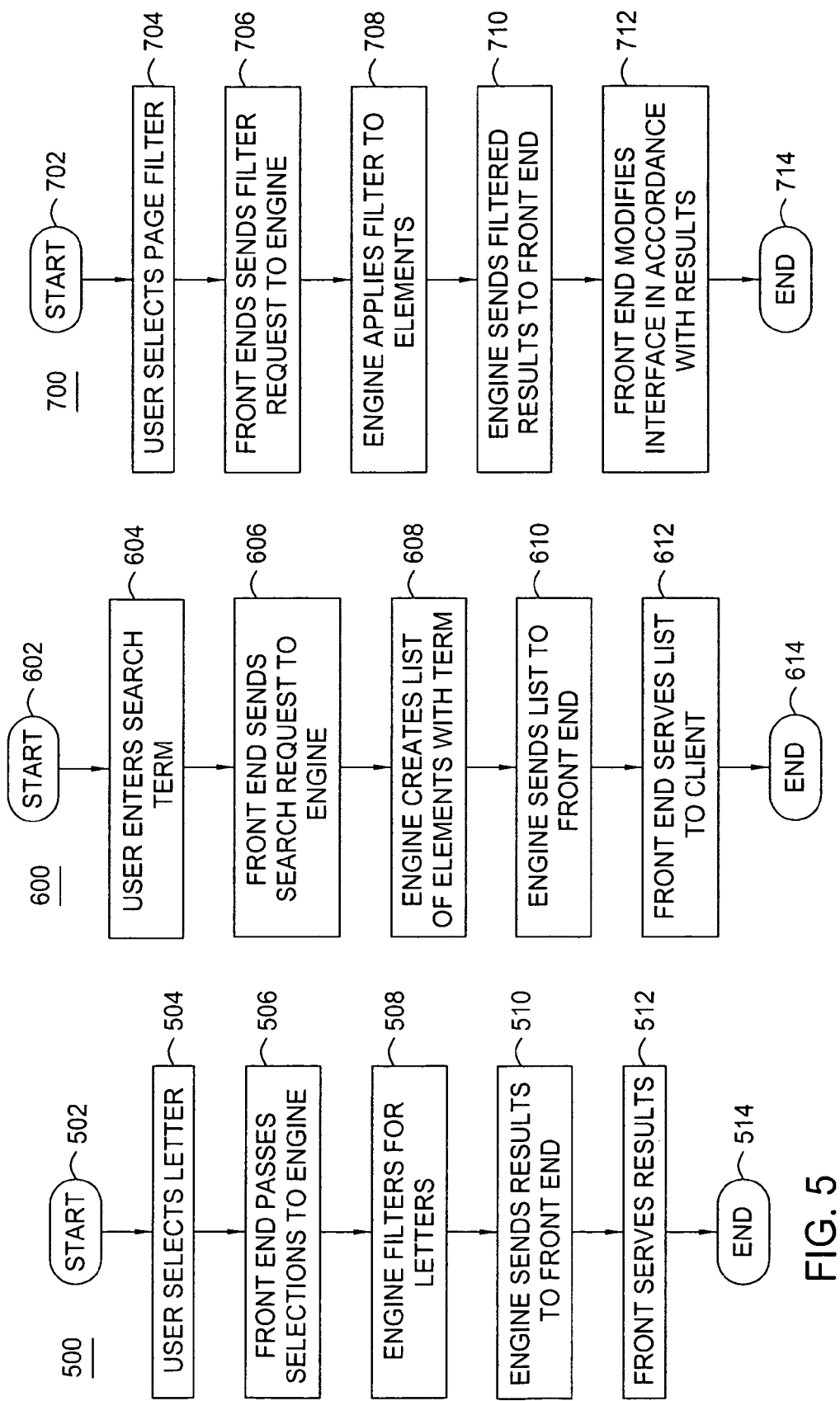

METHOD AND SYSTEM FOR ACCESSING INTERFACE DESIGN ELEMENTS

BACKGROUND OF THE INVENTION

1. Field of the Invention

Embodiments of the present invention generally relate to computer data searching, indexing, and/or accessing applications and, more particularly, to a method and apparatus for accessing interface design elements.

2. Description of the Related Art

The display of information through the use of the web and other computer applications offers broad advantages over traditional media outlets. Rather than having the information defined by the display medium, the content creator is offered a broad range of choices for the display, control, and access of data. Programmable controls and interfaces ensure that the content creator is only limited by his creativity and expertise.

However, the art of interface design is still relatively new. The knowledge of how to technically implement a particular control within an interface does not always equate to an efficient or aesthetically pleasing interface. Websites and applications that are designed with inadequate tools are often difficult to interact with or counterintuitive, resulting in wasted time and frustrated users.

To combat these problems, different design paradigms have been developed. Control, style, or design pattern suites may be provided to assist the content creator. However, having the tools at one's disposal may not translate to effective usage. While forums and discussion boards may provide useful examples and discussion of best-practices, suggestions, and examples of proper interface design, such data may be difficult to navigate. It would be useful for such information to be directly linked to these tools through an easily navigable interface. Therefore, there is a need in the art for a method and apparatus for indexing interface design elements.

SUMMARY OF THE INVENTION

An embodiment of the present invention comprises a method and system for indexing design elements. The method, when performed by a special purpose computer executing a design repository application, comprises creating one or more metadata entries, linking the metadata entries to one or more design elements, and providing an interface to access the design elements. The metadata entries comprise data describing the design elements located within a design repository. The interface displays the design elements in accordance with their associated metadata.

The system comprises a set of design element data, a set of design element metadata, a design repository engine, and a design repository front end. The design element data stores one or more design elements. The design element metadata stores data describing the set of design element data. The design repository front end provides an interface for the design element data and design element metadata. The design repository engine receives and processes commands from the front end to access the element data and metadata and create the interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a flow diagram depicting a method for selecting a design component based on a letter in accordance with an embodiment of the present invention;

FIG. 6 is a flow diagram depicting a method for searching for one or more design components in accordance with an embodiment of the present invention;

FIG. 7 is a flow diagram depicting a method for filtering a display of design components in accordance with an embodiment of the present invention.

DETAILED DESCRIPTION

Figure 1:
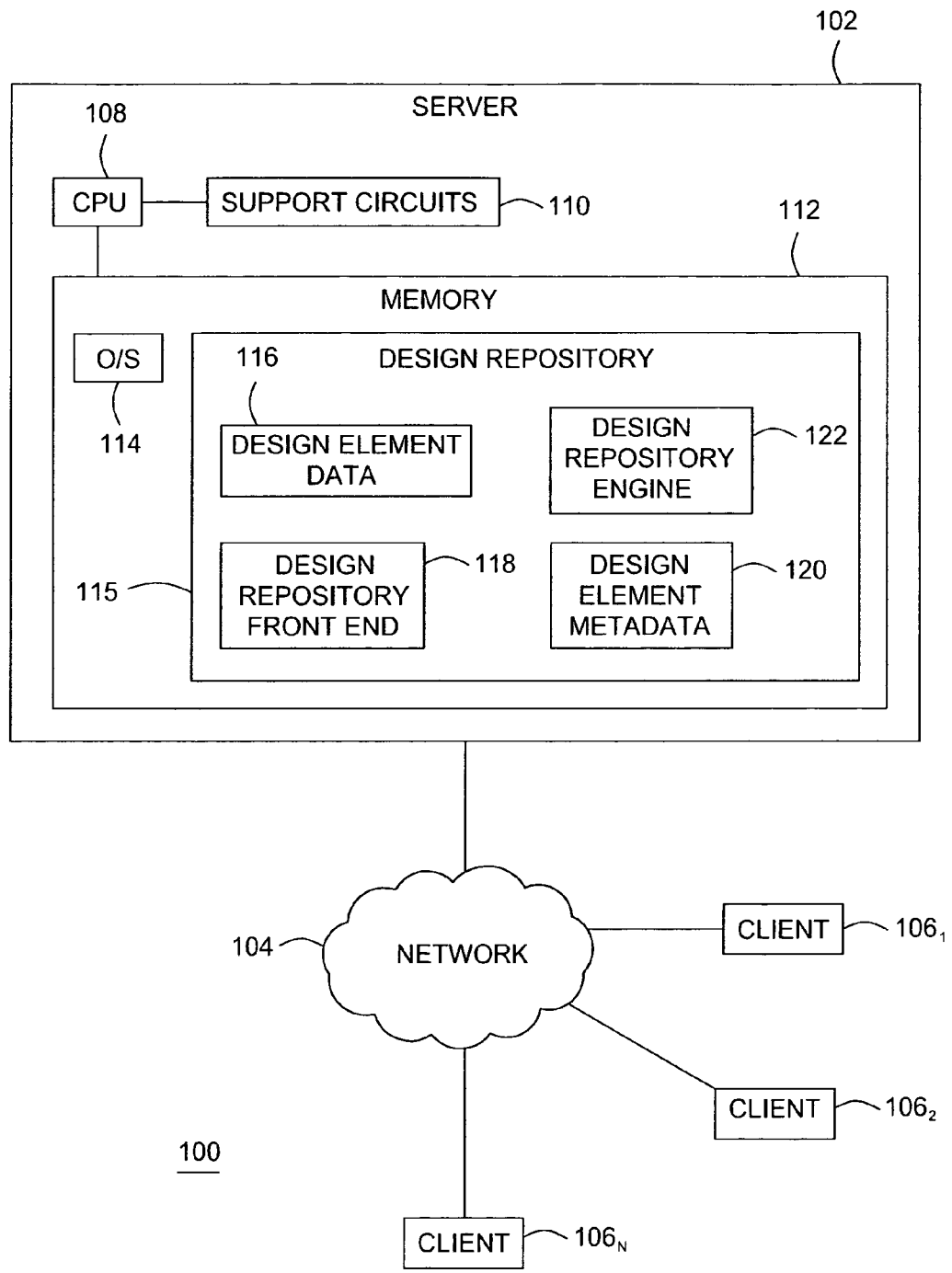
FIG. 1 is a block diagram depicting a system in which an embodiment of the present invention is used.

FIG. 1 is a block diagram depicting a system containing an embodiment of the present invention. The system comprises a general purpose computer that operates as a specific purpose computer 102 coupled to a network 104 and one or more clients 106. The specific purpose computer 102 executes a design repository 115 containing an embodiment of the present invention. The specific purpose computer 102 may operate as a server for the network 104 and the one or more clients 106.

The general purpose computer is a computing device such as those generally known in the art. The specific purpose computer 102 includes a central processing unit (CPU) 108, support circuits 110, and memory 112. The CPU 108 may comprise one or more commercially available microprocessors or microcontrollers that facilitate data processing and storage. The various supporting circuits 110 are utilized to facilitate the operation of the CPU 108 and include such circuits as clock circuits, power supplies, cache, input/output circuits, and the like. The memory 112 may comprise random access memory, read only memory, removable storage, optical disk storage, disk drive storage, and combinations thereof. The memory 112 stores an operating system 114, and a design repository 115. In operation, the CPU 108 executes the operating system 108 to control the general utilization and functionality of the host computer.

The memory 112 is also comprised of a design repository 115. The design repository 115 is a software application that provides a method for storing and accessing data describing interface design elements. When executed by the CPU 108, the design repository 115 causes the general purpose computer to behave as a specific purpose computer 102 for the purpose of accessing, searching, and indexing interface design elements. For the purposes of this application, the term "access" refers to adding new design elements, adding, editing, modifying, or deleting design element metadata, and the like. The design repository 115 comprises a set of design element data 116, a set of design element metadata 120, a design repository front end 118, and a design repository engine 122.

The design element data 116 is a section of memory the design repository front end 118 may access that contains data describing interface design elements such as components, patterns, styles, controls, and the like. Although in the present embodiment the design element data 116 is shown as part of the design repository application 115, one or ordinary skill in the art would recognize that the repository data 116 could be stored in another section of memory, or on a remote server or storage device. The descriptive data may comprise screen captures, text descriptions, code samples, and/or other data necessary to implement the design elements.

The design repository 115 further comprises a design repository front end 118. The design repository front end 118 is an application component that provides an interface by which the client devices 106 may access the design element data 116. The client devices 106 may view, add, modify, and delete design elements within the design repository 115 via this interface.

The front end 118 displays the design elements in a logical manner as dictated by the design element metadata 120. The metadata 120 contains information about the design elements, and is discussed further below and with respect to FIG. 2. In one embodiment, the front end 118 supports indexing and searching the design elements by user tasks, tag relations, and a wireframe map. In one embodiment, the front end 118 tracks previously viewed elements and provides a menu to return to them.

In one embodiment, the front end 118 supports searching through the design patterns by a text search. The search function may further be filtered by design elements associated with particular metadata, such as that described further with respect to FIG. 2.

In one embodiment, the design repository front end 118 provides a web server interface for the clients accessing the design repository 115. As such, the front end 118 may include a web server application for providing an interface to the design repository. The front end 118 may also provide an interface for social networking links. For example, in one embodiment, the front end 118 allows a user to flag a particular design pattern for web networking sites such as DIGG, DEL.ICIO.US, STUMBLEUPON, and the like. In another embodiment, the user may subscribe to a Really Simple Syndication (RSS) feed for a design pattern so the user is notified when a pattern is updated. The front end 118 may also provide an interface for sending an email containing data about the interface element.

In one embodiment, the front end 118 may allow a user to log in with account credentials. The user may then specify configuration options unique to their account. The login credentials may further allow the user to save favorite patterns and pages, send private messages to other users, and post comments associated with their user credentials.

The design repository 115 also comprises a set of design element metadata 120. The design element metadata 120 contains information describing the contents of the design element data 116. The information located within the metadata 120 is indexed and hosted via the design repository front end 118. The design element metadata 120 is discussed further with respect to FIG. 2.

The design repository 115 additionally comprises a design element engine 122. This engine 122 maintains the links between the elements within the design element data 116 and the corresponding entries in the design element metadata 120. The design repository engine 122 performs queries and updates received from the front end 118 for searching, sorting, and otherwise accessing the data located within the element data 116 and the element metadata 120. For example, if a user wishes to perform a search function, the front end 118 receives the search request and forwards it to the engine 122. The engine 122 then converts the search request to a database query to access the design element data 116. The engine 122 formats the results of the query and passes the formatted results to the front end 118.

The design repository engine 122 also maintains the element data 116 and the element metadata 120. When new design elements are added to the element data 116, the engine 122 creates corresponding metadata entries in the element metadata 120. When new metadata entries are received via the front end 118, the engine 122 adds, modifies, or deletes the corresponding entries within the metadata 120 as appropriate.

In sum, the server 102 provides an interface to the repository 115 for the clients 106. The clients 102 request access to the repository 115 from the server 102 via the network 104. The server 102 creates a representation of the repository 115 suitable for viewing by the client 106. The front end 118 transmits this representation to the clients 102, such that the clients 102 may interface with the contents of the repository.

Figure 2:
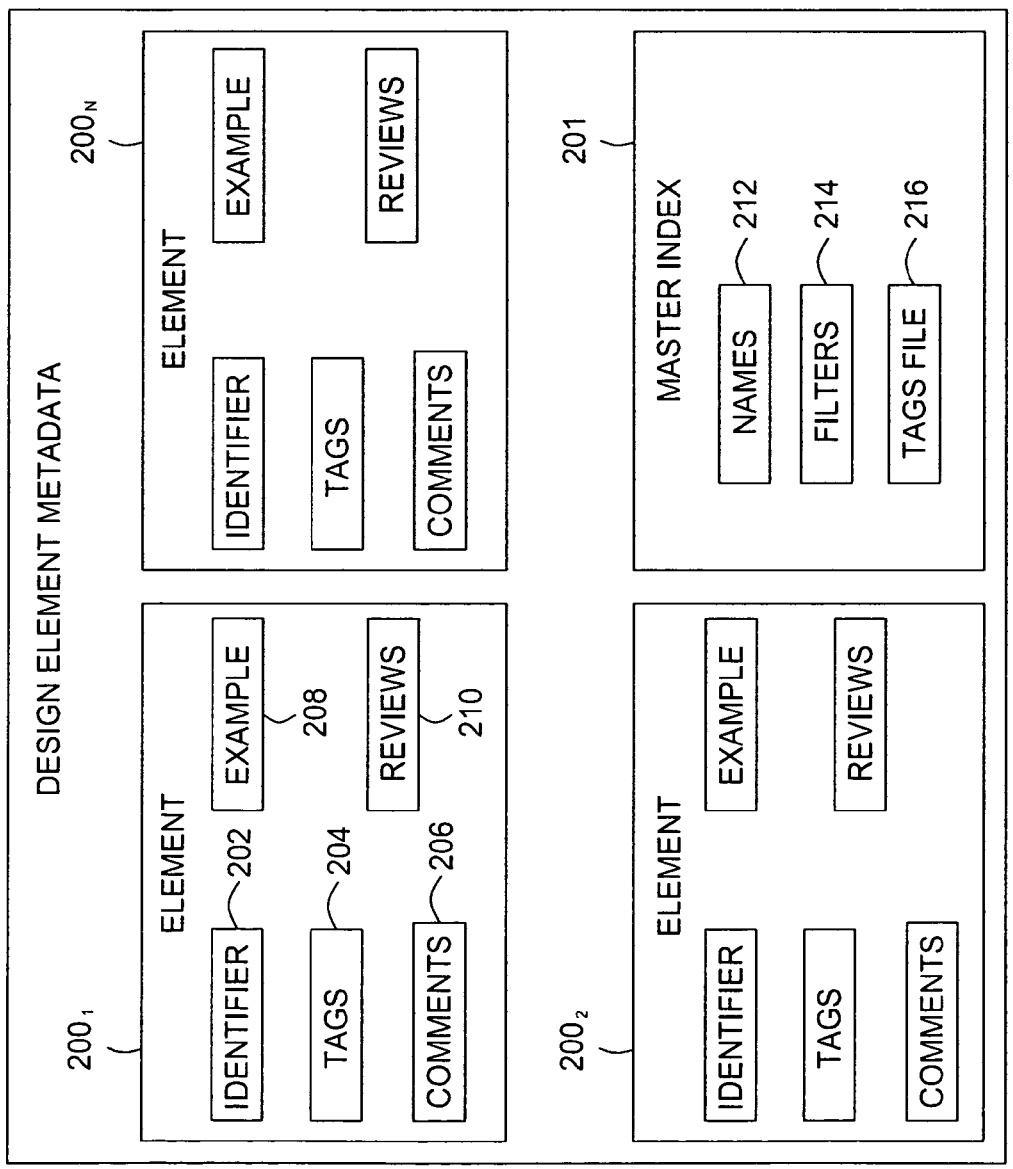
FIG. 2 is a block diagram depicting a design element metadata object in accordance with an embodiment of the present invention.

FIG. 2 is a block diagram depicting a set of design element metadata 120 as used in an embodiment of the present invention. The design element metadata 120 is comprised of design element metadata 200. The design element metadata 200 contains metadata describing the design elements located within the design element data 116. Each design element located within the repository element has a set of metadata 200. The element metadata 120 also contains a master index 201. The metadata describing a design element may be comprised of an identifier 202, tags 204, comments 206, examples 208, suggestions 210, and the like.

The identifier 202 identifies the corresponding design element located within the design element data 116. This identifier 202 is used to link the metadata 200 to the appropriate design element. The tags 204 are descriptive terms used to easily index the design element with similar elements. For example, a design pattern used to sort data with a data grid may have a "grid" tag, for easy indexing with other patterns used to display data in a grid format. If a user selects the "grid" tag within the front end 118, all design elements with the "grid" tag would be displayed.

In some embodiments, the metadata 200 may also include comments 206. The comments 206 data provides a mechanism by which users may comment on particular designs to provide practice tips, and other data that would be useful when implementing a particular design element. The comments 206 associated with an element may be displayed via the front end 118 when the user views the particular design element.

In yet another embodiment, the metadata 200 may include examples 208. Examples may provide screen captures, drawings, or sample code snippets of the design element. In one embodiment, the examples have an associated hyper link to link to a web page or application download page showing the design element in use. The examples 208 usefully provide a mechanism to show how the element may be implemented. In some embodiments, users may upload examples directly to the metadata 120 using the front end 118.

In yet another embodiment, the metadata 200 may include suggestions 210. The suggestions 210 allow the user to detail their experience and discuss the positives and negatives of the design element, and to suggest improvements. As with the comments 206, the suggestions 210 may be displayed along with the design element using the front end 118.

The element metadata 120 may also include a master index 201. The master index contains information describing each of the individual metadata sets 200 within the element metadata 120. This information may include element names 212, various filters 214, and a tags file 216. The names 212 provide a centralized index for storing the titles or names of each element for quick searching. The filters 214 are rules by which the front end 118 can select which elements to display. For example, a given filter may only display elements that correspond to a particular type of toolbar or screen location. The tags file 216 is a list of the possible tags that may be associated with the interface elements. In one embodiment, the tags file 216 provides a mapping for the tags 214 field within the metadata 200. For example, the tags 214 may be implemented as a numeric value and the tags file 216 associates a particular numeric value with a given text tag. The master index 201 may also include tag metadata describing the relationships between different tags to define relationships among different types of design components.

Figure 3:
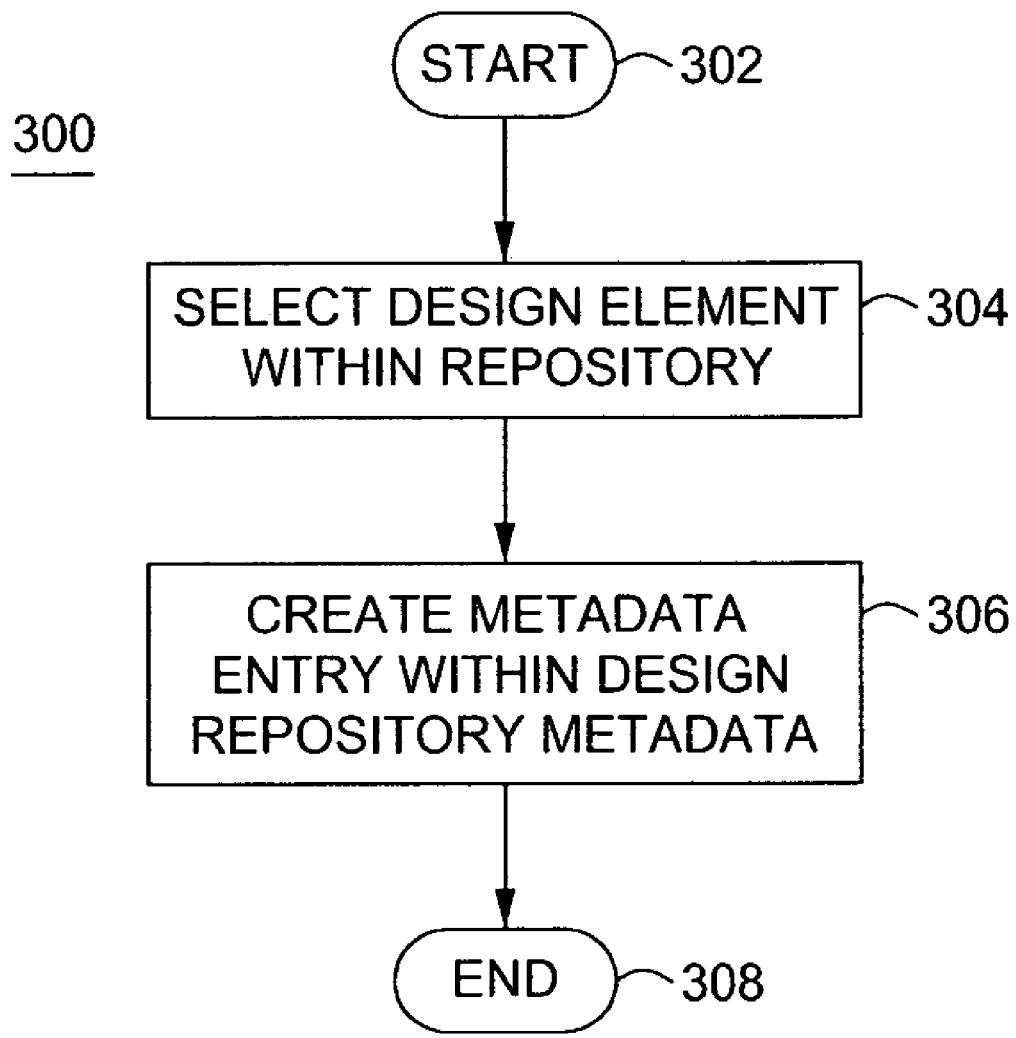
FIG. 3 is a flow diagram depicting a method for implementing an embodiment of the present invention.

FIG. 3 is a flow diagram of an embodiment of a method 300 for indexing interface design elements. The method begins at step at step 302, where one or more design elements are stored within the design element data 116. The design repository application 115 is executed to provide storage, an interface, and access for the design elements via the data 116, the front end 118, and the engine 122, respectively. The one or more design elements are stored within the design element data 116 and assigned one or more identifiers 202. The one or more design elements may be uploaded singly by a user, or it may be provided in a pre-configured set of design elements.

At step 304, the design engine 122 selects one of the design elements for the creation of set of metadata entries. This selection may be in response to a user input received via the front end 118, for example, uploading an example screen capture. The selection may also be in response to a newly added element to the design element data 116.

At step 306, the design engine 122 creates an appropriate entry for the selected design element within the design element metadata 120. This step may include populating the metadata 200 associated with the element with tags 204, examples 208, suggestions 210, and the like. If the design element is newly added to the element data 116, then the entry may consist of creating a blank set of metadata 200 and adding an entry to the master index 201.

At step 308, the method ends where the engine 122 has created a metadata entry in response to the request that triggered the method. The set of element metadata 120 created and indexed in this manner is searchable and accessible to the front end 118 to provide an interface to view and access the design elements and associated metadata. This interface may include allowing a user operating a client device to perform the access and social networking functions described with respect to FIG. 1. Embodiments of the interface are illustratively disclosed with respect to FIG. 4 and FIG. 5.

Figure 4:
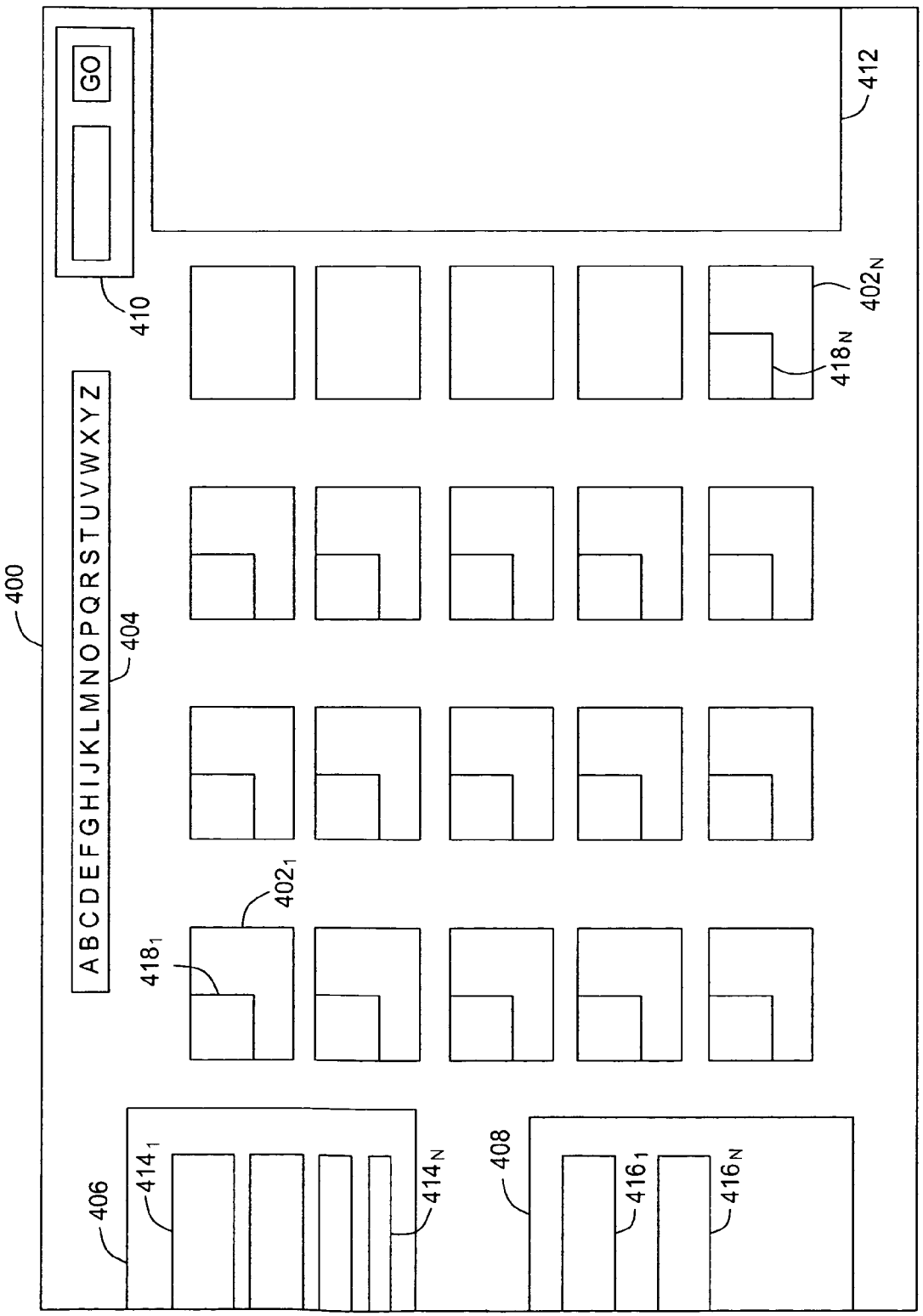
FIG. 4 is an illustration of a design component selection interface in accordance with an embodiment of the present invention.

FIG. 4 is an illustration of a selection interface 400 for selecting a design element in accordance with an embodiment of the present invention. The selection interface 400 is generated by the front end 118 using the metadata stored in the element metadata 116. The selection interface 400 is then sent to the client 106. FIG. 4 illustrates a selection menu containing multiple design element selection boxes $402_1$ $402_2$ . . . $402_n$, a letter selection bar 404, a pull out selection bar 406, a recently viewed bar 408, a search bar 410, and a filter list 412. The element selection boxes 402 each corresponding to a particular element located within the element data 116. When a user selects the selection box 402, they are taken to the element's detail page. The element detail page is discussed further with respect to FIG. 8. The selection box 402 may also include an image 418, such as a picture or screen capture of the element in use. The element selection box 402 may be marked with the name and a brief description of the corresponding design element.

The letter selection bar 404 allows for indexing by the first letter of the element name. When the user selects a letter, design components from the current list beginning with that letter will be displayed. The method by which the engine 122 processes such a command is discussed further with respect to FIG. 5.

The pull out selection bar 406 provides a method to search the design element via several different methods. Each search method, such as by name, by use, by tag relations, or by wireframe map, corresponds to a search selection box 414 within the pull out selection bar 406. In one embodiment, the pull out selection bar 406 is displayed as a tab that expands when the user moves the cursor onto it.

The recently viewed bar 408 provides a list of design elements the user has viewed. As the user navigates through the interface, each time they view a design element detail page, a link 416 is placed within the recently viewed menu. In this manner the user can quickly navigate to a pattern they viewed without needing to search the repository again.

The search bar 410 provides functionality for searching the repository using a text string. The user may input the text string within a field of the bar. The method by which the engine 122 processes such a command is discussed further with respect to FIG. 6.

The filter list 412 provides a list of filters to show particular design components. In some embodiments, these filters are tags. When a particular tag is selected, only components associated with that tag are shown. By using the tag metadata contained within the metadata index 201, the tags define the relationships between different design components.

FIG. 5 is a flow diagram depicting an embodiment of a method 500 for filtering of design elements by letter, such as with the letter selection bar 404. At the start 502, the interface displays a letter selection bar 404. At step 504, the user selects a letter. At step 506, the front end 118 receives the letter selection and sends a filtering request to the engine 122. At step 508, the engine 122 filters the list of elements to find the elements that begin with the particular letter selection. At step 510, the engine 122 sends the filtering results to the front end 118. At step 512, the front end 118 serves the filtered results to the client 106.

FIG. 6 is a flow diagram depicting an embodiment of a method 600 for searching the design element repository 115. At step 602, the front end 118 has served an interface to the client 106, including a search bar 410. The user may enter a text string into the search bar 410. At step 604, the user generates a search request using the text string. The front end 118 receives the search request and, at step 606, sends the request to the engine 122. At step 608, the engine 122 searches the element data 116 and element metadata 120 for instances of the search term. At step 610, the engine 122 sends the results of the search query to the front end 118. At step 612, the front end 118 uses the results to update the interface and sends the updated interface to the client 106. The method ends at step 614.

FIG. 7 is a flow diagram depicting an embodiment of a method 700 for filtering design elements for display. At step 702, the front end 118 has served an interface to the client 106, including a list of filters 412. At step 704, the user selects a filter from the filter list 412. The act of selecting a filter sends a request to the front end 118. At step 706, the front end 118 forwards the request to the engine 122. At step 708, the engine applies the filter to the element data 116 and element metadata 120. The filter represents a specific set of rules for displaying various elements. For example, the filter may only display elements relating to a toolbar or a list box, or the filter may select design elements that have a particular user tag added. The engine 122 generates a list of elements that match the criteria of the filter by searching the element data 116 and element metadata 120. At step 710, the engine 122 sends the generated list to the front end 118. At step 712, the front end 118 modifies the interface to show the generated list so that it may be displayed by the client 106. At step 714, the method ends with the interface having been updated to display the filtered list.

Figure 8:
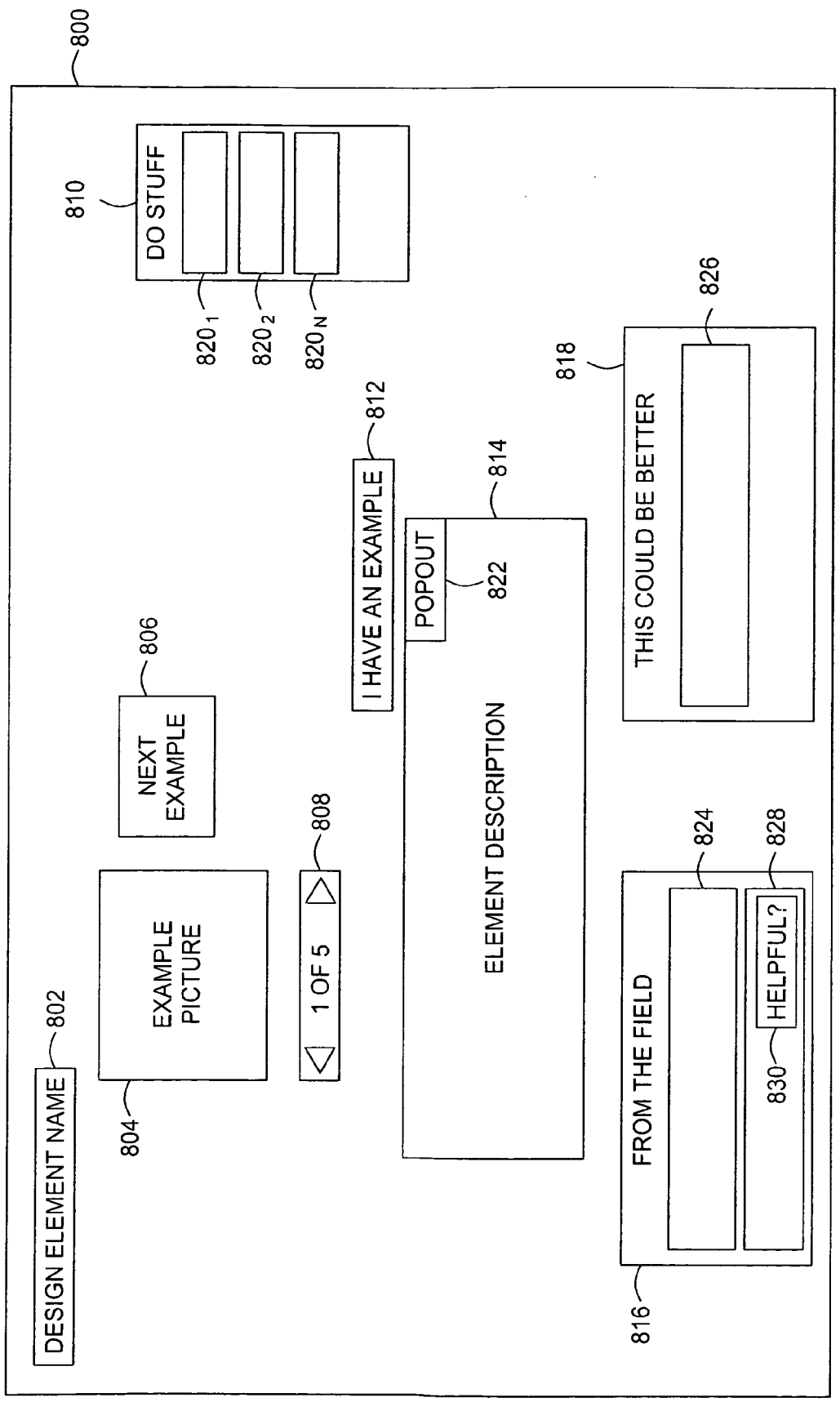
FIG. 8 is an illustration of a design component detail display in accordance with an embodiment of the present invention.

FIG. 8 is an illustration of a viewing interface 800 for viewing a design element in accordance with an embodiment of the present invention. The viewing interface 800 illustrates the detailed view of a selected design element. The viewing interface 800 is generated by the front end 118 using the metadata stored in the element metadata 116. The interface 500 is then sent to the client 106.

In one embodiment, the viewing interface 800 comprises a design element name 802, an example picture 804, a next example 806, an example selector 808, a multifunction box 810, an example upload box 812, an element description 814, a comments box 816, and a suggestions box 818.

The design element name 802 is a text field that includes the name of the design element described in the viewing interface 800. The example picture 804 shows a sample screen capture or illustration of the design element in use. The next example 806 is a small representation of the next image to be displayed. The example selector 808 chooses which example illustration to display within the example picture box 804.

The multifunction box 810 allows a user to perform multiple applications, such as flagging the particular design pattern for DIGG, DEL.ICIO.US, STUMBLEUPON, and other link aggregation websites. The multifunction box 810 may also include links to subscribe to RSS feeds about different aspects of the element. These functions are performed by selecting links $820_1$, $820_2$, . . . , $820_n$ located within the multifunction box.

The element description 814 contains text describing the proper way to implement the selected design element. This description 814 may include implementation details, situations where the element would be helpful, sample code, and/or other information needed to implement the selected design pattern. The element description 814 may include a pop out link 822 to display the text of the field in a separate window.

The comments box 816 allows a user to read and upload comments about the selected design. The entry field 824 allows the user to enter text describing their experience with the selected design pattern. After the text is submitted within the entry field 824, it will be displayed in a display field 828. The display field 828 may optionally include a comment review feature 830 allowing the user to select whether the particular comment was helpful.

The suggestion field 818 allows users to upload improvement suggestions for the selected design element. The suggestion field 818 includes similar fields to the comments box 816, such as a data entry field 826 and a display field.

While the foregoing is directed to embodiments of the present invention, other and further embodiments of the invention may be devised without departing from the basic scope thereof, and the scope thereof is determined by the claims that follow.

The invention claimed is:

1. A computer-implemented method for accessing interface design elements performed by a design repository application executing on a special-purpose computer comprising:
   creating one or more metadata entries for one or more user interface design elements located within a design repository;
   linking the metadata entries to the one or more user interface design elements; and
   providing an interface to access the user interface design elements and associated metadata entries,
   wherein the metadata entries comprise at least two or more of a list of screen captures, tags, suggestions, and comments, the interface provides an ability to upload the two or more of screen captures, comments, tags, and suggestions, and the interface provides a configurable search option including searching for two or more of a list comprising a tag, a tag metadata entry, a design component name, a key word, a type of functionality, and a visual example.

2. The method of claim 1, further comprising providing login credentials for saving a set of configuration options for the interface.

3. The method of claim 1, wherein the interface allows the submission of new design elements.

4. A design repository stored in memory and executed on a processor to perform indexing interface design elements comprising:
   a set of design element data for representing one or more user interface design elements;
   a set of design element metadata for storing data describing the set of user interface design element data;
   a design repository engine for managing the user interface design element data and design element metadata; and
   a design repository front end for providing an interface to the design repository engine, the user interface design element data and the design element metadata,
   wherein the set of design element metadata comprises at least two of a list of screen captures, tags, suggestions, and comments, the design repository front end allows the submission of new design elements, and the design repository front end provides a configurable search option searching by two or more of a list comprising a tag, a tag metadata entry, a design component name, a key word, a type of functionality, and a visual example.

5. The design repository of claim 4, wherein the design repository front end provides login credentials for saving a set of configuration options for the interface.

6. The design repository of claim 4, wherein the design repository front end sends one or more commands received via the interface to the design repository engine for processing.

7. The design repository of claim 6, wherein the one or more commands are chosen from a list comprising at least one of a keyword search, a tag selection, a filter selection, and a letter selection.

8. The design repository of claim 6, wherein the one or more commands are chosen from a list comprising at least one of adding a comment, adding a review, adding an example, selecting whether a comment has been helpful, and selecting whether a suggestion has been helpful.

9. The design repository of claim 4, wherein the interface provides an option for marking a design element for a link aggregation site.

10. A system for indexing interface design elements by a special-purpose computer programmed by a design repository comprising:

means for creating one or more metadata entries for one or more user interface design elements located within a design repository;
means for displaying the one or more user interface design elements in accordance with the metadata entries;
means for providing an interface to access the one or more user interface design elements and metadata entries as displayed; and
means for adding a new user interface design element to the repository,
wherein the one or more design element metadata entries comprises at least two of a list of screen captures, tags, suggestions, and comments, the interface allows the submission of new design elements, and the interface provides a configurable search option including searching by two or more of a list comprising a tag, a tag metadata entry, a design component name, a key word, a type of functionality, and a visual example.

* * * * *